United States Patent [19]
Stodghill et al.

[11] Patent Number: 5,710,901
[45] Date of Patent: Jan. 20, 1998

[54] METHOD AND APPARATUS FOR VALIDATING DATA ENTERED BY A USER

[75] Inventors: Scott A. Stodghill, Evergreen; Llad Mattie, Englewood, both of Colo.

[73] Assignee: TCI Summitrak of Texas, Inc., Englewood, Colo.

[21] Appl. No.: 581,778

[22] Filed: Dec. 29, 1995

[51] Int. Cl.$^6$ .................................................. G06F 3/00
[52] U.S. Cl. .................. 395/339; 395/185.1; 395/764; 371/48
[58] Field of Search ................. 395/339, 185.1, 395/183.22, 326–358, 939, 764, 185.01; 371/48

[56] References Cited

U.S. PATENT DOCUMENTS

| | | | |
|---|---|---|---|
| 4,459,678 | 7/1984 | McCaskill et al. | 364/900 |
| 4,484,304 | 11/1984 | Anderson et al. | 364/900 |
| 5,021,973 | 6/1991 | Hernandez et al. | 395/765 |
| 5,179,657 | 1/1993 | Dykstal et al. | 395/161 |
| 5,208,907 | 5/1993 | Shelton et al. | 395/766 |
| 5,325,290 | 6/1994 | Cauffman et al. | 364/401 |
| 5,544,303 | 8/1996 | Maroteaux et al. | 395/161 |
| 5,613,065 | 3/1997 | Ishibashi et al. | 395/185.01 |

*Primary Examiner*—Raymond J. Bayerl
*Assistant Examiner*—A. Katbab
*Attorney, Agent, or Firm*—Baker & Botts, L.L.P.

[57] ABSTRACT

A method and apparatus for validating data entered into a data processing system. A plurality of windows is provided, each including at least one widget area into which data is entered by the user. A "doda object" is associated with each widget and contains keys identifying where the data is to be stored in a database, as well as member functions which operate to format the entered data for storage and format information retrieved from the database for display in the widget. During the validation procedure, all of the data associated with each of the widgets in a window are first examined for errors in conjunction with its associated doda object. In addition, a second validation step is performed in which the data associated with certain widgets are compared to those of other widgets in the window, in accordance with an algorithm selected by the user, to detect the presence of errors resulting from data entered inconsistently between widgets. If any errors are detected, an error message is displayed within a validation window. The widget in which the error was detected may then be selected by the user by double-clicking on the error message.

6 Claims, 3 Drawing Sheets

METHOD AND APPARATUS FOR VALIDATING DATA ENTERED BY A USER

BACKGROUND

This invention relates to the validation of data entered into a computer data processing system.

Many types of applications involve the manual entry by a human user of various types of information into a computer database for storage or processing. One type of system involves a generic library to which many different developers have access. One example of such a system is one which is used to store all of the files for a business organization, such as its technical and financial data. Any employee of the business may retrieve and process the information stored in the system.

In such applications, ensuring that the information entered into the database is accurate is an important factor, since very often the users who retrieve and process the information stored in the database are not the users who originally entered the data into the database.

SUMMARY OF THE INVENTION

The present invention relates to a window validation system and apparatus for verifying that data entered into a computer data processing system is correctly formatted. The system includes a plurality of windows, each including at least one widget area into which data is entered by the user. A "doda object" is associated with each widget and contains keys identifying where the data is to be stored in a database, as well as member functions which operate to format the entered data for storage and format information retrieved from the database for display in the widget. During the validation procedure, all of the data associated with each of the widgets in a window are first examined for errors in conjunction with its associated doda object. In addition, a second validation step is performed in which the data associated with certain widgets are compared to those of other widgets in the window, in accordance with an algorithm selected by the developer, to detect the presence of errors resulting from data entered inconsistently between widgets. If any errors are detected, an error message is displayed within a validation window. The widget in which the error was detected may then be selected by the user by double-clicking on the error message.

BRIEF DESCRIPTION OF THE DRAWING FIGURES

DETAILED DESCRIPTION

Some familiarity with the basic aspects of a computer data processing system is assumed in the following discussion. Accordingly, all of the hardware portions of the basic data processing system will not be illustrated. Briefly, with reference to FIG. 1, the present apparatus generally comprises a CPU having a database, a display area 10 such as a CRT display, and an apparatus such as a keyboard and/or a mouse or trackball for entering data into the system.

The visual display or screen 10 includes at least one window area 12. The term "window" will be used hereinafter in a manner known in the art to denote a rectangular portion of the display area which contains alphanumeric or graphic symbols representing various programs or operating states for the system. More than one window may be displayed on the screen in an overlapping fashion, to represent the several application programs or operating states available to the user, with the topmost window generally representing the currently active window. The user may select any of the available windows to represent the active window by changing the "focus" of the screen onto that window.

The visual display includes a cursor or arrow (hereinafter called a cursor) which can be moved around the display area with the aid of a mouse, trackball, or keys on the keyboard. The cursor can be used to select and activate various applications represented by graphic symbols on the display area. For example, the user can "re-focus" onto another window by moving the cursor into that window area and pressing a key or button when the cursor is in the desired location (called "clicking" on the desired location, or more commonly, double-clicking by pressing a key twice in rapid succession), in a manner known in the art. In this manner, the user can alternate between entering data in different windows.

Additionally, each window includes graphic symbols, generally known and "icons", each of which represents a program or application available to be executed. The user can select one of these icons, and initiate execution of the application or program represented y the icon, by clicking on it in the display area, in a manner known in the art.

Figure 1:
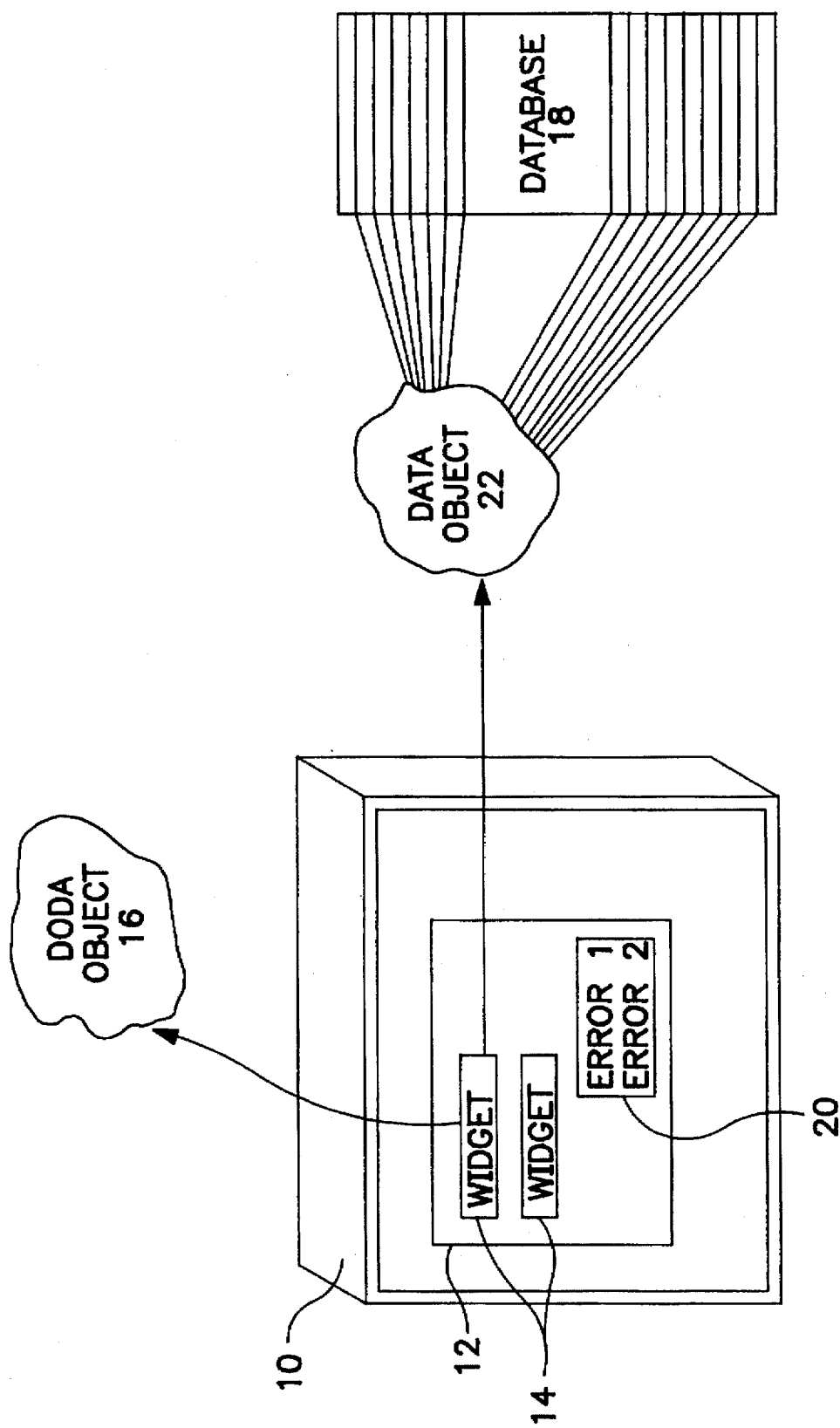
FIG. 1 illustrates the apparatus of the present invention.

In the present case, with reference to FIG. 1, each window includes at least one symbol called a widget 14. Each widget 14 within the window 12 is a subset of the display area into which data that is to be stored in the database or otherwise processed by the system, such as a text field, may be entered via the keyboard. Each window may simultaneously include many widgets, so that a user can enter and manipulate many different types of data. In general, user may select one of many widgets displayed in a window by moving the screen cursor with the aid of a mouse or trackball into the widget area, and pressing a button on the mouse or keyboard to make the desired widget into the "active" widget, and then keying in the appropriate data.

By way of example, a system may be programmed to operate a computer spreadsheet program containing many fields for entering financial data. A single data field or group of related data fields may be considered a widget into which particular data may be typed and stored in the database for later use.

Each widget is operatively linked to the database 18 by an interface called a "data object" or "port", illustrated in FIG. 1 as element 22. The data object 22 utilizes the keys obtained from a doda object 16 (discussed below) to access the appropriate location or address in the database at which the desired widget data has been or is to be stored.

Each widget 14 is associated with a "doda" (acronym for "data object data attribute") object, shown symbolically in FIG. 1 as element 16. The doda object 16 maintains (usually as a set of flags, pointers, and the like) information or "keys" which identify the proper address location(s) in the dataport 22 at which the converted data is to be stored, or from which data is to be retrieved and transferred to the widget for display.

In addition, in typical data processing systems the data entered into or displayed in a widget 14 is usually in a different format than the information symbols that are actually stored in the database 18 as representing that data. By way of example, the raw alphanumeric data from the widget 14 may be subjected to various compression techniques prior to storage in the database 18 in order to minimize the amount of memory space occupied by the data, or it may be grouped or packeted with other data prior to storage in order to maximize storage efficiency, or the data may be processed according to any number of other procedures known in the art. In one common arrangement, data which is displayed in a widget 14 may be considered to have been "formatted" for display, as for example, when a string of numbers representing a calendar date is placed in the well-known MM/DD/YY format, while the same data may be stored in the database 18 without the intervening slash marks or hyphens, in what may be called an "unformatted" manner. Although all of these different examples will fall within the scope of this invention, the following discussion will adopt, for illustrative purposes, the terminology "formatted" to refer to data that is in a format appropriate for display in a widget 14, while data that is in a format that is appropriate for storage in the database 18 will be referred to as "unformatted" data.

In order to ensure that formatted data entered into a widget 14 is transformed into unformatted form for storage prior to conveying the data to the database 18, and that unformatted data retrieved from the database 18 is properly formatted for display in a widget 14, the doda object 16 contains information and algorithms (also called "member functions") which identify the data format corresponding both to the database 18 and the widget 14 to which the doda object 16 is linked, and operates to transform the data into the proper format for the desired operation (storage or display). In other words, any formatted data sent from a widget 14 to the database 18 is first transformed by the doda object 16 for that widget into unformatted data for storage. Similarly, any unformatted data retrieved from the database 18 into a widget 14 is formatted for display by the doda object 16.

As will be evident, different doda objects will include different member functions or algorithms depending upon the type of data that is to be displayed in their associated widgets; for example, one widget may be configured to show a calendar date, while another may be configured to display a name, an address, a dollar amount, or any other type of information. The particular member functions used by each doda object are not limited and may be selected or programmed by the developer.

It should be noted that where a data is entered into a system one character at a time, as through a keyboard, the data may also be considered to be unformatted. Thus, as data is being entered in this manner, it may also be operated upon by the appropriate member functions to place it into the correct format for the widget.

Additionally, a single data processing system may include multiple databases which may be accessed during different program sequences. A particular widget may therefore be linked to different data objects or ports when different program sequences are being executed. In this situation, the program window 12 may be configured to contain information (pointers) identifying which data ports are linked with which widgets. In this case, any keys retrieved from the doda object will first be passed to the window, which will locate the data port to be accessed with that key, and then send the key to the appropriate port for further processing.

Both the doda object 16 and the data object 22 are hidden from the user, who sees only the widget data on his CRT display 10.

The window 12 includes, in addition to the displayed widgets 14, a smaller error validation window 20 which is used to store and display any error messages that may occur during operation. The validation window 20 receives error messages as strings, along with optional pointers identifying the source or location of the error and a severity indicator, and displays the strings in the validation window.

It is a fundamental characteristic of this type of system that the widget 14 does not, by itself, "how" or include information indicating the form of the data that is being manipulated. Instead, all information describing what characters are allowed to be entered, the format of the data, etc., are known to and processed by the doda objects.

Within this system, validation of data entered within a window may be performed as described below. The validation procedure may be initiated at the request of the user, as by entering a particular command or pressing a particular key, or automatically, for example, at certain time intervals, or in response to the occurrence of certain events, such as, for example, when the user indicates that he has completed data entry. Once initiated, the validation process is performed on all widgets within a particular window (usually the active window, although other windows may be selected as desired).

During window validation, the data entered into each widget 14 within the window 12 is verified by the system in conjunction with the associated doda object 16 using any number of alternative error-checking algorithms as desired. For example, the doda object 16 may be instructed to check if the entered data contains the correct number and type of text characters. Additionally, the system may instruct the doda object 16 to compare the data entered in the widget against a database of all valid information that can be entered into that widget; for example, a calendar date entry may be compared against a list of all valid calendar dates to ascertain that an entry of "December 32" is not a valid entry. Numerous other algorithms may be used, either alone or in combination with other algorithms. The data entered in each widget within the desired window is checked in this manner by the associated doda object.

In the event that invalid data is discovered to have been entered into a widget, the system concludes that an error condition exists, and generates an appropriate error message string for display in the validation window 20. This string includes an alphanumeric text message designed to inform the user of the presence of an error. The error message also includes a pointer identifying the widget in which the error is deemed to have occurred.

When the error message(s) have been displayed in the validation window 20, the user may use the mouse to "click" on any of the displayed error messages, causing screen focus to shift to the widget indicated by the pointer associated with that error message string, to enable the user to re-enter the correct data into the widget. After the data is re-entered by the user, validation is repeated to ensure that no additional errors exist.

Additionally, the window performs a second validation step of comparing the data entered into different widgets within the window, according to any of several possible algorithms designed by the developer, in order to detect errors resulting from the entry of inconsistent or incompatible data in different widgets. For example, if the program being used requests the entry of a beginning date of a project or occurrence into one widget and an end date into another widget, the window may include an algorithm which compares the two to ensure that the end date is later in time than the beginning date, and results in an error if it is not. Similarly, in a spreadsheet program, the window could be designed to check that all of the figures in a particular column added up to the correct total or are greater than figures in another column. Any combination of algorithms could be utilized, depending upon the particular application to which the window is directed and the types of errors that the user desires to prevent.

In the event that an error is detected, the window generates an error message string and displays it in the validation window 20. The string may also include a pointer identifying the particular widget(s) whose data created the error. If the user subsequently clicks on one of the error messages in the validation window 20, then screen focus could be shifted to that widget, or to any other portion of the window as designed by the developer. If the data from more than one widget contributed to the error, then focus could be shifted to an appropriate default widget.

If no error condition is detected in either step of the validation process, then the window proceeds according to its originally programmed sequence.

In order to further conceptually illustrate the above process, the following summary of one example of a possible program sequence is presented. In response to a particular sequence, a widget 14 retrieves a key from its doda object 16 and passes it to the window 12 with a request that the window identify the data port 22 that the key references. When the widget receives the port identifier, it passes the key to the port 22. With the aid of the key, unformatted data is retrieved from the database through the data object or port 22 and passed to the widget 14. The widget 14 then passes the data to the doda object 16 which formats the data according to its member functions and returns the formatted string to the widget 14 for display. Once displayed, a user may choose to modify or update the data by manipulating the cursor and typing in new characters into the widget. The newly entered characters are passed by the widget 14 to the doda object 16, which either accepts the character, rejects the character, or adds format characters (e.g., adds a hyphen to a phone number), as appropriate. When the widget 14 is to validate its data, either automatically or in response to a separate instruction, its data is passed again to the doda object 16 and checked against various error checking algorithms and member functions. When the widget data is to be written to the database 18, the key is again retrieved from the doda object 16 and sent to the window 12 to obtain the appropriate port 22, and the data (properly formatted by the doda object for storage) is transferred to the port and ultimately to the database 18 for storage.

Figure 2:
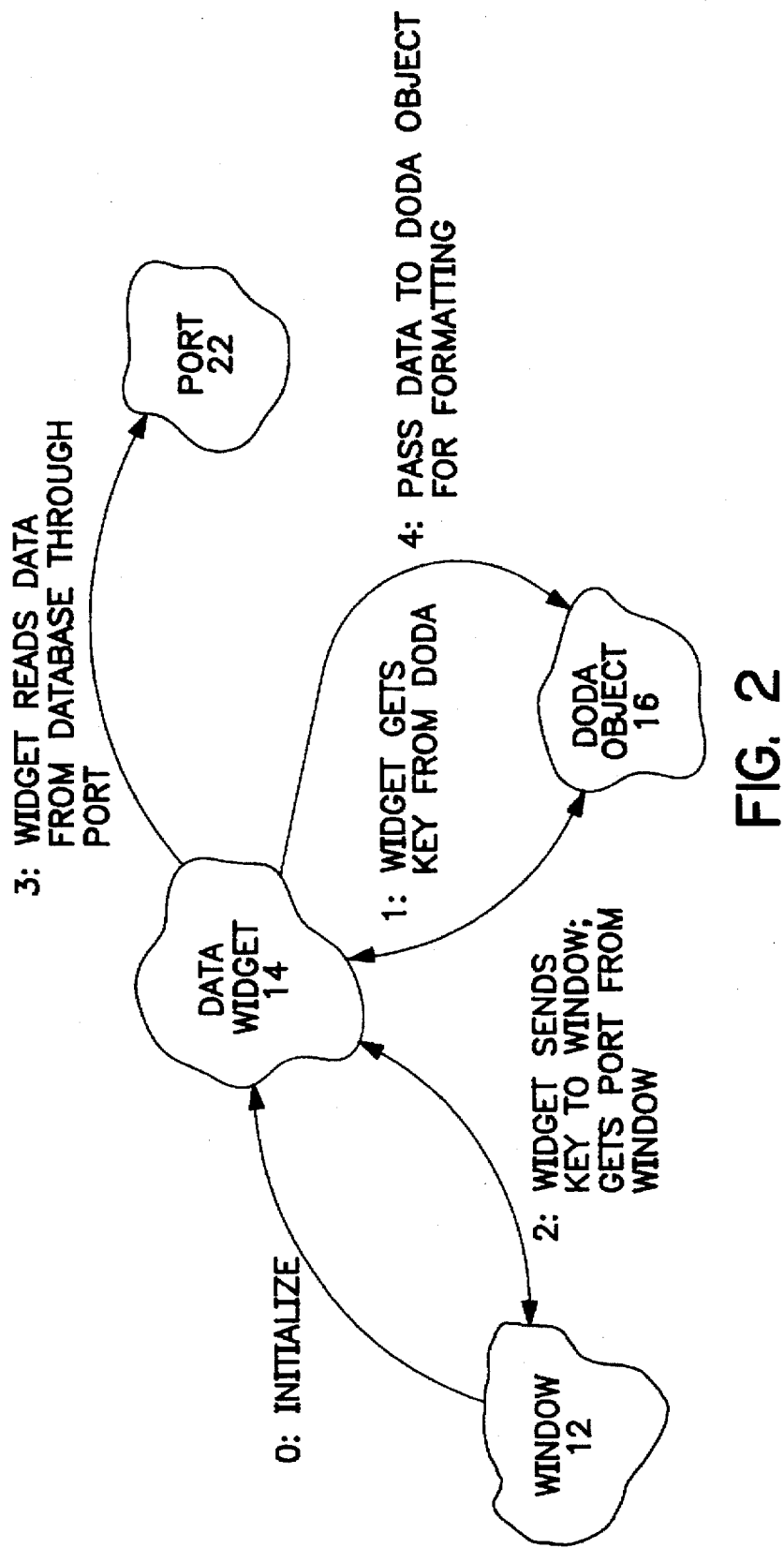
FIG. 2 illustrates the relationships between the various objects.
Figure 3:
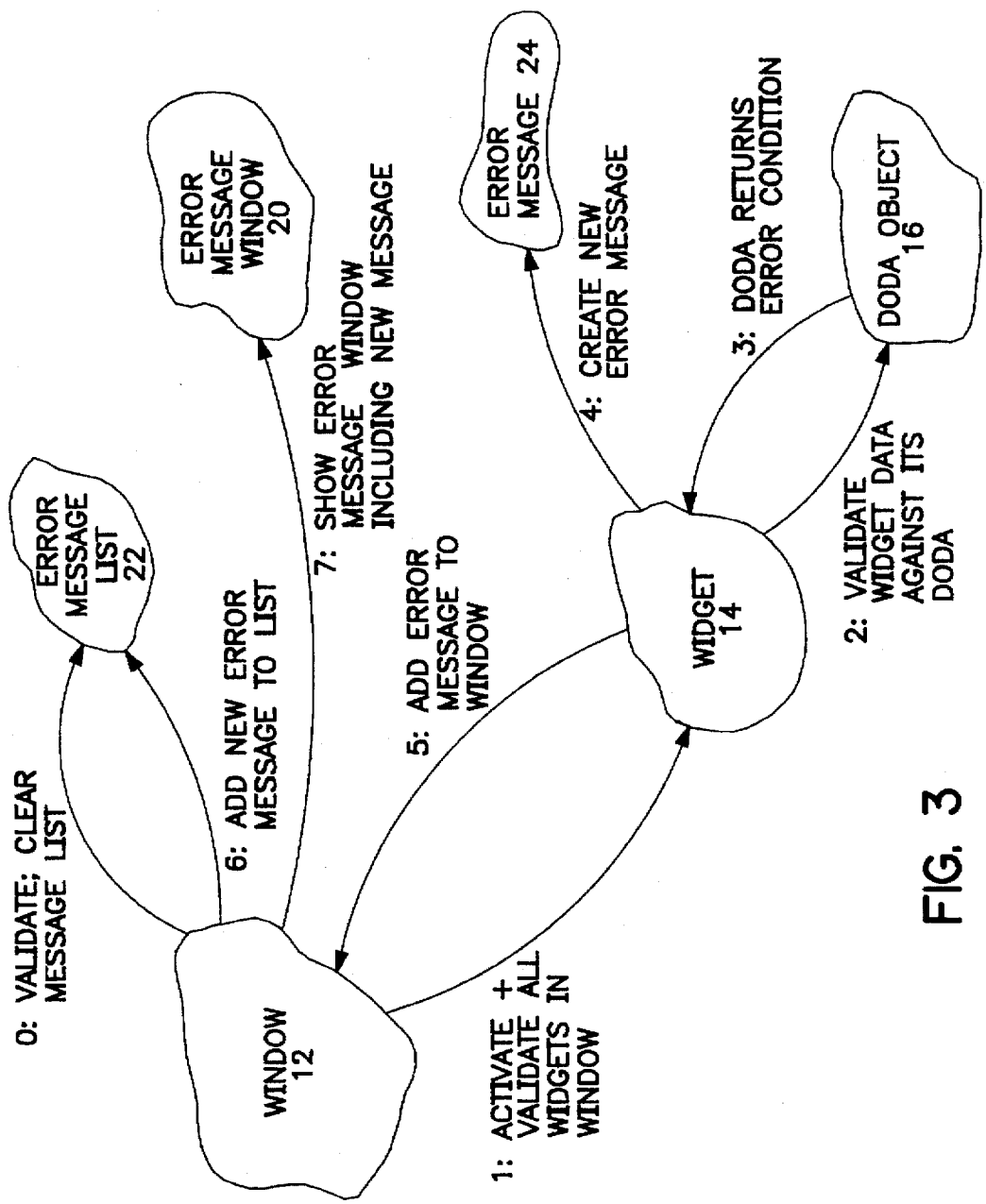
FIG. 3 is an object diagram illustrating the validation apparatus and procedure.

FIGS. 2 and 3 illustrate the present invention diagrammatically, by object scenario diagrams which show the various steps in the sequence. FIG. 2 depicts an operation in which data is retrieved from the database for display in a widget, and FIG. 3 depicts a validation operation.

Referring first to FIG. 2, some of the various objects of the present invention are shown, including a window 12, a data widget 14 within the window 12, a doda object 16 associated with the widget 14, and a port 22 linking the widget 14 to a database (not shown in FIG. 2). Each of the arrows connecting the objects of FIG. 2 represents a step of the sequence, with the arrows indicating the direction of data or information flow, from one object to another object. Each arrow is numbered and labeled to describe the represented function. Thus, the steps illustrated in FIG. 2 to retrieve data from the database for display in a widget are as follows:

0. Initialize the window and all widgets within the window

1. The widget 14 retrieves the key corresponding to the desired data from its doda object 16.

2. The widget 14 sends the key to the window, along with a request for identification of the appropriate port 22 through which the data may be retrieved; the window responds by sending a pointer identifying the port 22.

3. The widget 14 reads the appropriate data from the location in the dataport 22 corresponding to the key.

4. The retrieved data is passed to the doda object 16 for formatting.

When all of these steps have been completed, the data is ready for display in the widget 14

FIG. 3 shows many of the same objects as in FIG. 2, with the addition of new objects corresponding to the error message window 20, an error message list 22, and an error message 24. The steps in FIG. 3 illustrate the validation procedure, as follows:

0. Validate the window 12 and clear the error message list 22 of any old messages that might have been retained from the last validation procedure.

1. Activate and validate all widgets 14 in the window 12.

2. Validate the data entered into each widget 14 against the information (error checking algorithms, member functions, flags, pointers, etc.) in its doda object 16.

3. If the doda object 16 indicates that no error conditions exist, proceed in accordance with the original program sequence. Otherwise, the doda object 16 will return an indication of an error condition.

4. In response to the detection of an error condition, the widget 14 creates a new error message string 24 which describes the error. The widget also creates a pointer (not shown) which identifies the widget.

5. The error message 24 and any accompanying pointers are sent to the window 12.

6. The error message 24 is added to the error message list 22.

7. The error message string 24 is displayed in the error message window 20. If the user then double clicks on the error message in the window, focus is shifted to the widget 14 in which the error was detected.

Steps 2-7 are repeated for each active widget 14 in the window 12.

Thus, the present method and apparatus provides for validation of data entered into one or more widgets 14 within a window 12. In the event an error condition is detected, the user can easily locate the source of the error by clicking on the appropriate error message within the validation window 20, which shifts the screen focus to the widget containing the erroneous entry. The user can then re-enter the data. After re-entry, the validation process is repeated, to ensure that the new dam also does not contain an error. The process continues until the data in all of the widgets within the window has been validated.

Although the present invention has been described hereinabove with particular reference to the preferred embodiment, it should be understood that various alternatives, modifications and adaptations may be made without departing from the scope of the invention as set forth in the appended claims.

We claim:

1. A system for storing and retrieving information to and from a database, comprising:

keyboard means for entering data into the system;

display means, for visually displaying alphanumeric and graphic symbols representing requests for data and the data entered into the system, said display means comprising at least one window disposed within the display means, a validation window associated with each window and capable of being displayed on said display means within said window, and at least one widget disposed within each of said windows, wherein all data entered into the system via said keyboard means is associated with at least one widget;

means for detecting an error condition relating to the data associated with each of said widgets within a window;

means responsive to said means for detecting an error condition for creating an error message string for display in the validation window associated with the window in which said error condition was detected, said means also creating pointer data identifying the widget in which the error condition was detected.

2. A system for storing and retrieving information to and from a database according to claim 1, further comprising re-entry means responsive to said means for creating an error message, said re-entry means re-displaying the widget identified by the pointer data associated with the error message string so as to enable re-entry of the data associated with that widget.

3. A data processing system having the capability of validating data entered into the system, comprising:

display means, comprising at least one window displaying a plurality of requests for information, and at least one widget within each window associated with at least one of said displayed requests for information;

means for entering data into the system such that the entered data is associated with at least one of said widgets;

a doda object associated with each of said widgets, the doda object including member functions adapted to ascertain whether data entered in association with the widget is correctly formatted;

means for detecting an error condition in the data objects associated with each of said widgets, based upon the doda object associated with that widget;

means responsive to the detection of an error condition for displaying an error message on a portion of said display means and for pointing to the location of the error condition.

4. A data processing system having the capability of validating data entered into the system according to claim 3, further comprising re-entry means responsive to said means for displaying an error message, said re-entry means re-displaying the location of the error condition so as to enable re-entry of data.

5. A method of validating information entered into a data processing system having visual display means, comprising the steps of:

creating at least one window area on said visual display means;

displaying a plurality of requests for information in said window area;

displaying a plurality of widgets in said window area, each widget associated with at least one of said requests for information;

associating data entered in response to said requests for information with at least one of said widgets;

creating at least one doda object associated with each of said widgets, said doda object including member functions adapted to ascertain whether data associated with the widget is properly formatted;

for each widget, detecting, with the assistance of the doda object for that widget, the presence or absence of an error condition in the data associated with that widget, and in response to the detection of an error condition, creating an error message string and a pointer identifying the widget associated with the data object in which the error condition was detected;

displaying for selection by a system operator, all error message strings on a portion of said window area;

in response to the selection by a system operator of one of the displayed error message strings, re-displaying the widget identified by the pointer associated with the selected error message string so as to enable re-entry of the data associated with that widget.

6. A method of validating information entered into a data processing system having visual display means, comprising the steps of:

creating at least one window area on said visual display means;

displaying a plurality of requests for information in said window area;

displaying a plurality of widgets in said window area, each widget associated with at least one of said requests for information;

as data is entered into the system, associating the entered data with at least one of the widgets;

creating at least one doda object associated with each of said widgets, said doda object including member functions adapted to ascertain whether entered data associated with the widget is properly formatted;

for each widget, detecting, with the assistance of the doda object for that widget, the presence or absence of an error condition within the data associated with that widget by comparing said data with a stored database of available valid data, and in response to the detection of an error condition, creating an error message string and a pointer identifying the widget associated with the data in which the error condition was detected;

for each widget, detecting, with the assistance of the doda object for that widget, the presence or absence of an error condition within the data associated with that widget by comparing said data with the data associated with other widgets in said window area, and in response to the detection of an error condition, creating an error message string and a pointer identifying the widget associated with the data in which the error condition was detected;

displaying for selection by a system operator, all error message strings on a portion of said window area;

in response to the selection by a system operator of one of the displayed error message strings, re-displaying the widget identified by the pointer associated with the selected error message string so as to enable re-entry of the data associated with that widget.

* * * * *